Patented Oct. 29, 1940

2,220,041

UNITED STATES PATENT OFFICE 2,220,041

VANADIC ACID ESTERS OF HOMOCYCLIC ALCOHOLS

William H. Hill, Stamford, Conn., assignor to American Cyanamid Company, New York, N. Y., a corporation of Maine No Drawing. Application November 18, 1939, Serial No. 305,173

5 Claims. (Cl. 260—429)

This invention relates to esters of homocyclic alcohols and vanadic acids.

Vanadium compounds such as vanadium pentoxide have been used extensively as solid oxidation catalysts in a great many reactions, for example converting sulfur dioxide to trioxide, sugar to oxalic acid, naphthalene to phthalic anhydride, anthracene to anthraquinone. Many of the above reactions are carried out in the vapor phase in which a gaseous mixture of the reacting substances is passed over the vanadium pentoxide. In this type of reaction it is important that the temperature be controlled within a certain range. If the temperature rises too high complete combustion takes place to an increasing extent and the yields are correspondingly lower. Many of these disadvantages are avoided by liquid phase oxidations. The conditions under which these oxidations are carried out in general are more easily controlled than the vapor phase oxidation reaction. However, the vanadium compounds generally available heretofore have not been soluble in organic liquids and hence could not be used effectively in liquid phase oxidation reactions.

According to the present invention various vanadic acid esters of monocyclic alcohols are produced which have unusual properties of considerable commercial importance. They are generally soluble in organic liquids and particularly petroleum products such as fuel oil and hence can be used to improve the burning characteristics of fuel oil.

Another field for the use of these compounds is in the oxidizing of organic compounds in the gaseous and especially liquid phase oxidation procedures. These vanadic esters also exhibit extreme opacity to ultra violet light and are useful as light screens in various lacquers or resinous compositions to block out undesirable short light wave radiations. They may also be incorporated into nitrocellulose and cellulose acetate sheet materials to exclude harmful light rays. Certain of the vanadic esters of the present invention have been found to be useful in paints and varnishes as driers. The improved solubility properties of these esters make them particularly useful as driers and they produce a rapid and uniform oxidation of paint and varnish coatings.

It is not necessary that the vanadic esters of the present invention be in a pure form to be useful in the various operations as pointed out above. Catalytic action and opacity to ultraviolet light is due vanadium itself. The compositions of the present invention therefore, may be either the ortho vanadic ester of a cyclic alcohol, the meta vanadic ester of a cyclic alcohol or other polyvanadic esters or mixtures and solutions of the various esters.

The following examples will further illustrate the present invention.

Example 1

Technical 85% $V_2O_5$ was introduced into cyclohexanol and the mixture was boiled gently for about two hours. The solution assumed a yellow color which deepened to a reddish brown as the boiling progressed. The solution was filtered to remove the excess $V_2O_5$ and yielded a reddish brown solution which was found to be miscible with kerosene and a heavy liquid petroleum. Water was added to a portion of the filtered solution whereupon the water was colored yellow. An analysis showed a vanadium pentoxide content of 7.38% which corresponds to an ester content of about 30%.

Example 2

Technical 85% $V_2O_5$ was boiled gently with benzyl alcohol for about two hours and then filtered to remove the excess $V_2O_5$. The solution was a very dark gray with a violet tint. The solution was found to be soluble in kerosene. Upon shaking with water a yellow coloration was produced showing that the benzyl vanadate had been formed. The yield is not quantitative as some decomposition takes place with the formation of benzaldehyde.

Example 3

Technical 85% $V_2O_5$ was boiled with terpineol for about three hours. The solution was very dark with a brownish tint. Upon the addition of water a yellow coloration was produced indicating that terpineol vanadate had been produced. The product can be dissolved in kerosene, toluene and a heavy petroleum oil.

Example 4

Technical 85% $V_2O_5$ was boiled with a tetrahydrofurfuryl alcohol and filtered. The solution was very dark with a greenish tint. Upon the addition of water a yellow coloration was produced which indicated that tetrahydrofurfuryl vanadate had been produced. The solution was found to be miscible with kerosene and a heavy petroleum oil.

While it is apparent from the above examples that cyclic alcohols will react directly with $V_2O_5$ to form vanadates by simply boiling the components, other methods may also be used in some cases, such as making a vanadate of an alcohol of a suitably low boiling point and then replacing that alcohol by one of higher boiling point. This method is particularly advantageous where the vanadates of the higher boiling point alcohols decompose readily at the boiling point of the alcohol of where the alcohols are easily oxidized. Reactions between the higher boiling alcohols and $V_2O_5$ may also be carried out advantageously in the presence of a lower boiling inert solvent. In some instances the liquid in which the ester is to be used as a catalyst can serve as the reaction medium.

The esters of the present invention are usually produced in the form of a mixture of esters of ortho, meta, and higher polyvanadic acids. The proportions of the particular esters will vary with temperature, light, presence of moisture and the like. In general, high temperatures and anhydrous conditions favor the ortho, whereas lower temperatures and the presence of moisture result in a larger proportion of the meta and higher polyvanadates. Except for the fact that the polyvanadic esters are colored, whereas the ortho esters are light colored or colorless, the esters are substantially equivalent for most commercial uses, and the exact composition of a particular mixture is not usually of importance. Where it is desirable to separate the esters, this can be simply effected by suitable fractional distillation, preferably under vacuum. Another method of isolating the individual esters is by cooling and concentration. These procedures materially increase the cost of the product and for most uses the isolated esters do not produce any advantage.

While the foregoing examples relate to the production of the vanadic esters of representative cyclic alcohols, the present invention is not limited thereto, but includes broadly the vanadic esters of any esterifiable cyclic alcohol belonging to the carbocyclic or heterocyclic series. Among the other alcohols which may be used to produce the esters of the present invention are methylcyclohexanol, dimethylcyclohexanol, the menthols, tolyl alcohol and phenylethyl alcohol.

What I claim is:

1. An ester of a homo cyclic alcohol and vanadic acid.
2. An ester of an aromatic alcohol and vanadic acid.
3. An ester of an alicyclic alcohol and vanadic acid.
4. A cyclohexyl vanadate.
5. A benzyl vanadate.

WILLIAM H. HILL.

---

CERTIFICATE OF CORRECTION.

Patent No. 2,220,041.   October 29, 1940.

WILLIAM H. HILL.

It is hereby certified that error appears in the printed specification of the above numbered patent requiring correction as follows: Page 1, first column, line 27, for "monocyclic" read --homocyclic--; page 2, first column, line 9, for "of" read --or--; and that the said Letters Patent should be read with this correction therein that the same may conform to the record of the case in the Patent Office.

Signed and sealed this 3rd day of December, A. D. 1940.

Henry Van Arsdale,
Acting Commissioner of Patents.

(Seal)

CERTIFICATE OF CORRECTION.

Patent No. 2,220,041.   October 29, 1940.

WILLIAM H. HILL.

It is hereby certified that error appears in the printed specification of the above numbered patent requiring correction as follows: Page 1, first column, line 27, for "monocyclic" read --homocyclic--; page 2, first column, line 9, for "of" read --or--; and that the said Letters Patent should be read with this correction therein that the same may conform to the record of the case in the Patent Office.

Signed and sealed this 3rd day of December, A. D. 1940.

(Seal)

Henry Van Arsdale,
Acting Commissioner of Patents.